Oct. 22, 1957     H. E. LUEBBERS ET AL     2,810,807
ELECTRIC WELDING HOLDER
Filed July 5, 1955     2 Sheets-Sheet 1
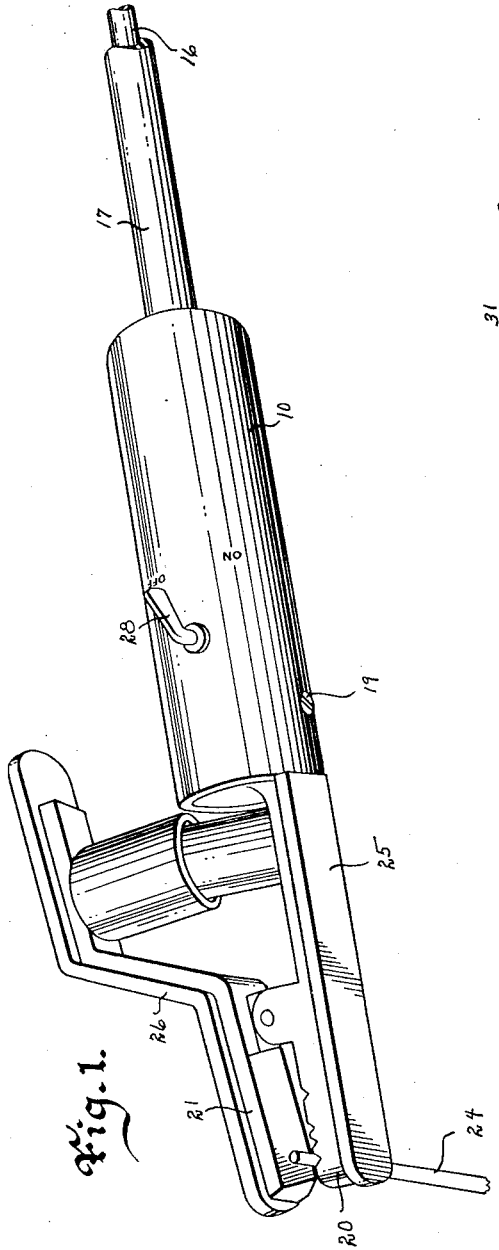
Inventors
Herman E. Luebbers
& Roger A. Hanes
by Talbert Dick & Adler
Attorneys
Witness
Edward P. Seeley Oct. 22, 1957
H. E. LUEBBERS ET AL
2,810,807
ELECTRIC WELDING HOLDER
Filed July 5, 1955
2 Sheets-Sheet 2
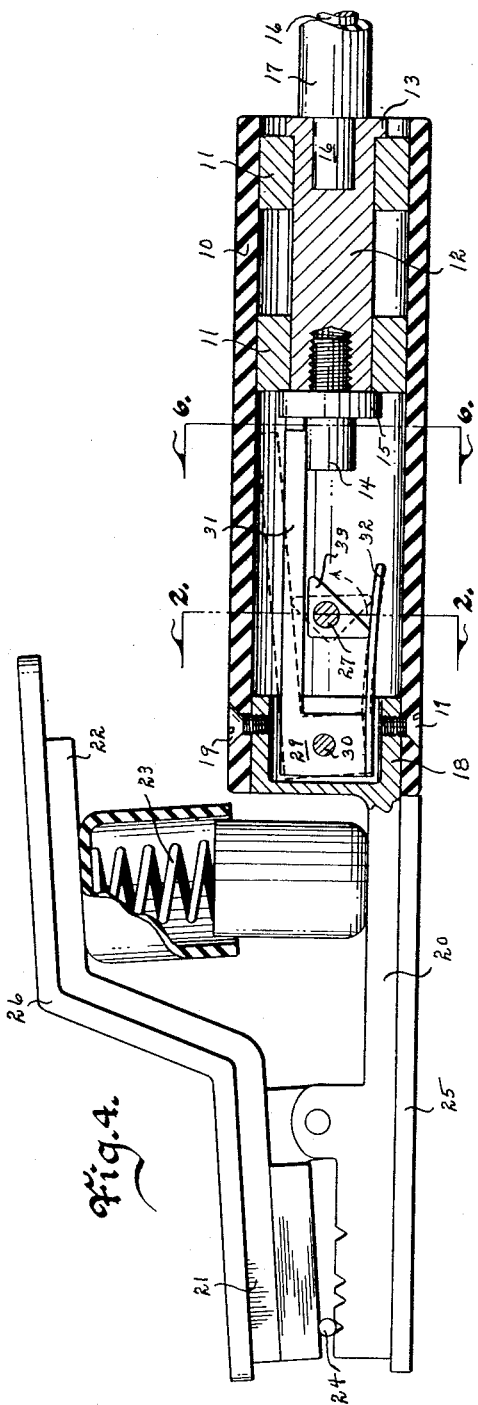
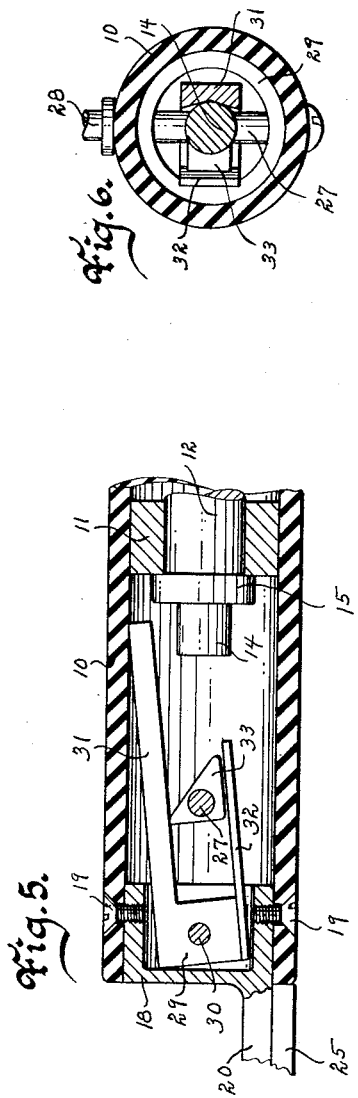
Inventors
Herman E. Luebbers
& Roger A. Hanes
by Talbert Dief & Adler
Attorneys
Witness
Edward P. Seeley

United States Patent Office 2,810,807
Patented Oct. 22, 1957

2,810,807
ELECTRIC WELDING HOLDER
Herman E. Luebbers and Roger A. Hanes, Fort Dodge, Iowa Application July 5, 1955, Serial No. 520,028

7 Claims. (Cl. 200—157)

This invention relates to a welding rod holder and more particularly to an electric one having a relatively heavy cable leading from a source of electrical energy.

Electric welding holders are universally used. In general they consist of metal jaws for holding the welding rod, a handle portion, and a stiff electric cable for furnishing the necessary electricity. Great fatigue is experienced by the user due to the twisting action of the stiff cable. This not only results from the often laying down and picking up the holder, but is present even when the cable is not twisted but the tool holder is rotated to different angles necessitated by the work, or the surroundings. Also such electric welders due to this resistance to rotation make for poor and inaccurate work. Furthermore, such holders are subject to shock and arc flash.

Therefore, one of the principal objects of our invention is to provide an electric welding holder that may be instantly placed in a condition of free rotation relative to its electric power cable.

More specifically one of the objects of this invention is to provide an electric rod holding device for welding that when its switch is open the cable lead may rotate independently of the rod holding jaws but when the switch is closed, the cable is rigidly locked to the holder against independent rotation.

A still further object of our invention is to provide an electric welding holder that is easy to operate, thereby making for more accurate and superior workmanship and welding.

A still further object of this invention is to provide an electric welding rod holder that permits the placement of or removal of rods, easily, quickly and without danger.

A still further object of this invention is to provide an electric welding holder that gives longer use and wear to its electric cable.

Still further objects of our invention are to provide an electric welding holder that is economical in manufacture, durable in use, and refined in appearance.

These and other objects will be apparent to those skilled in the art.

Our invention consists in the construction, arrangements and combination, of the various parts of the device, whereby the objects contemplated are attained as hereinafter more fully set forth, specifically pointed out in our claims, and illustrated in the accompanying drawings, in which:

Fig. 1 is a perspective view of our holder ready for use,

Fig. 2 is a cross sectional view of the device taken on line 2—2 of Fig. 4,

Fig. 3 is an enlarged perspective view of the switch and cable locking mechanism, Fig. 4 is an enlarged longitudinal sectional view of our welding holder and more fully illustrates its construction, Fig. 5 is an enlarged longitudinal sectional view of the handle portion showing the switch in open condition, and Fig. 6 is a cross sectional view taken on line 6—6 of Fig. 4.

In these drawings we have used the numeral 10 to designate the tubular grip housing of any suitable non-conductive material such as plastic or Bakelite. Inside the rear end portion of this grip handle are bearing members 11 for rotatably supporting a metallic shaft 12. A shoulder 13 is formed on the rear end of the member 12 for limiting its forward sliding movement as shown in Fig. 4. A metallic stub shaft 14 is threaded into the front center end of the shaft 12 and has a flange shoulder 15 for preventing the rear sliding movement of the shaft 12. The numeral 16 designates a metallic cable attached at one end to the rear end of the shaft 12 and is adapted to have its other end electrically connected to a source of electrical energy. The numeral 17 designates an insulation tube around the metallic cable wire 16. The numeral 18 designates a metallic cup portion having its open end extending toward the shaft 12 and its body in the forward end portion of the handle 10. This portion 18 is detachably held in place by screws or like 19. The numeral 20 designates the fixed metallic jaw member of the holder and extends forwardly from the cup 18 as shown in Fig. 5. Hinged to this jaw 20 is the movable metallic complementary jaw 21. The rear end portion 22 of this jaw 21 forms a depressable lever portion. This portion 22 and the rear portion of the jaw 20 are yieldingly held apart by spring means 23, thereby yieldingly holding the two jaws together for clamping onto a welding rod 24. The numeral 25 designates a non-electro-conductive insulation plate on the bottom of the jaw 20 and overlapping its side edges and end. The numeral 26 designates an insulation plate on the top of the jaw 21 and its portion 22. This non-electro-conductive plate overlaps the sides and end of the portions 21 and 22. These insulation plates protect the user and reduces the chances of the jaws from accidentally contacting any adjacent metallic ground. The jaw portion 22 is manually depressed for removal or replacement of a welding rod. The numeral 27 designates an actuating rod rotatably extending transversely through the tubular housing 10. The numeral 28 designates a thumb or finger engageable lever on one end of the actuating rod 27 and which is located outside the grip housing 10 as shown in Fig. 1. The numeral 29 designates a metallic block portion movably positioned in the cup portion 18 by being mounted on a metallic cross bearing pin 30 in the cup. The numeral 31 designates a metallic bar on the upper portion of the block 29 and which extends rearwardly to a point above the forward end portion of the stub shaft 14. The under rear end portion of this bar 31 is concave as shown in Fig. 3, for conforming to the curvature of the stub shaft. The numeral 32 designates a leaf spring extending rearwardly from the bottom of the block 29. This spring has a length less than that of the length of the bar 31, but the two normally extend substantially parallel with each other but in spaced relationship at each side of the actuating rod 27. The numeral 33 designates a triangular lug of non-electro-conductive material fixed on the rod 27 and between the bar 31 and the leaf spring 32. In describing our device and its operation, consideration must be given to the nature of electric welding holders. While it may be annoying for the electric cord of a soldering iron, telephone or like to become twisted, it is not particularly fatiguing due to the fact that the cord is of relatively light weight, and highly flexible. However, in welding holders the cable is relatively stiff and to rotate the tool even a quarter of a revolution encounters considerable resistance from the heavy cable. The reason for such cables, of course, is the high amount of electric power that must be transmitted. Also it is for this reason that our switch must be of positive contact in order to carry the electric load. Our switch therefore performs two functions, i. e. it makes rigid contact, when closed, onto the contact member 14, and secondly, by contacting the member 14 locks the cable from independent rotation relative to the tool. Thus to rotatably adjust the tool to the cable the lever 28 is actuated to an "off" position, thereby moving the finger bar 31 out of engagement with the member 14. With the bar 31 moved out of contact with the member 14, the cable may freely rotate relative to the tool and the tool will be electrically dead inasmuch as the electric circuit has been broken. Under such a status the tool may be easily rotated to left or right and may be safely laid on any surface without danger of electric contact. The tool may be as easily picked up, turned to the correct angle of attack for the work to be done, and then by placing the lever 28 to the "on" position, the cable will be locked to the tool and electric contact will be reestablished. Therefore our electrical welding holder eliminates danger of shock or arc flash, provides for safe replacement of the welding rod, can be operated by either hand, is easily adjusted to the needs of the user and the work to be done, and greatly reduces fatigue. With our welding tool the user proceeds with confidence even in crowded areas.

Any suitable means may be employed to bring the bar 31 into resilient tight contact with the member 14. However, we prefer the triangular member 33 which has one of its angles that of a right angle. By this structure and that of the cooperating elements when the handle 28 is placed on the "on" position, the member 33 will be out of contact with the bar 31, but its lower pointed end will be depressing the leaf spring 32, thereby yieldingly forcing the bar 31 tightly onto the member 14, thus making electrical contact and stopping any rotation of the shaft 12 in the handle as shown in Fig. 4. By reverse rotating the member 33, it is out of contact with the leaf spring but has engaged the bar 31, lifted the same from the member 14 and definitely holding it out of contact with the member 14 as shown in Fig. 5.

Some changes may be made in the construction and arrangement of our electric welding holder without departing from the real spirit and purpose of our invention, and it is our intention to cover by our claims, any modified forms of structure or use of mechanical equivalents which may be reasonably included within their scope.

We claim:

1. In an electrical connecting means, a handle housing, an electro conductive shaft means rotatably mounted in said handle housing, an electric lead wire having one end secured to said shaft means, an electro conductive movable member in said handle housing adapted to be operatively electrically connected to an electro conductive member leading from said handle housing, and a manually operated member on said handle housing capable of moving said movable member away from said shaft means or into locked contact with said shaft means.

2. In an electrical connecting means, a handle housing, an electro conductive shaft means rotatably mounted in said handle housing, an electric lead wire having one end secured to said shaft means, a spring loaded electro conductive movable member in said handle housing adapted to be operatively electrically connected to an electro conductive member leading from said handle housing, and a manually operated member on said handle housing capable of moving said movable member away from said shaft means or into locked contact with said shaft means.

3. In an electrical connecting means, a handle housing, an electro conductive shaft means rotatably mounted in said handle housing, an electric cable secured to said shaft means, a movable electro conductive member in said handle housing operatively, electrically connected to an electro conductive member leading from said handle housing, said movable electro conductive member capable of frictionally engaging said shaft means, and a manually operated means for selectively moving said movable electro conductive member into and out of engagement with said shaft means.

4. In an electrical connecting means, a handle housing, an electro conductive shaft means rotatably mounted in said handle housing, an electric cable secured to said shaft means, a bar of electro conductive material hingedly secured inside said handle housing and operatively electrically connected to an electro conductive member leading from said handle housing, said bar of electro conductive material capable of frictionally engaging said shaft means, and a lever means for selectively moving said bar into and out of engagement with said shaft means.

5. In an electrical connecting means, a handle housing, an electro conductive shaft means rotatably mounted in said handle housing, an electric cable secured to said shaft means, a bar of electro conductive material hingedly secured inside said handle housing and operatively electrically connected to an electro conductive member leading from said handle housing, said bar of electro conductive material capable of frictionally engaging said shaft means, a leaf spring connected operatively at one end to said bar and extending normally substantially in spaced relation to said bar, and a lever means between said bar and said leaf spring capable of engaging the same for moving said bar into and out of engagement with said shaft means.

6. In an electrical connecting means, a handle housing, an electro conductive shaft means rotatably mounted in said handle housing, an electric cable secured to said shaft means, a bar of electro conductive material hingedly secured inside said handle housing and operatively electrically connected to an electro conductive member leading from said handle housing, said bar of electro conductive material capable of frictionally engaging said shaft means, a leaf spring connected operatively at one end to said bar and extending normally substantially in spaced relation to said bar, and a cam lever means between said bar and said leaf spring capable of engaging the same for moving said bar into and out of engagement with said shaft means.

7. In an electrical connecting means, a handle housing, an electro conductive shaft means rotatably mounted in said handle housing, an electric cable secured to said shaft means, a bar of electro conductive material hingedly secured inside said handle housing and operatively electrically connected to an electro conductive member leading from said handle housing, said bar of electro conductive material capable of frictionally engaging said shaft means, a leaf spring connected operatively at one end to said bar and extending normally substantially in spaced relation to said bar, and a lever means having a triangular block between said bar and said leaf spring capable of engaging the same for moving said bar into and out of engagement with said shaft means.

References Cited in the file of this patent

UNITED STATES PATENTS

| | | |
|---|---|---|
| 1,295,457 | Engstrom | Feb. 25, 1919 |
| 1,462,620 | Peeler | July 24, 1923 |
| 1,589,977 | Lucas | June 22, 1926 |
| 1,865,003 | Hall | June 28, 1932 |
| 2,538,245 | Hiller | Jan. 16, 1951 |